Jan. 21, 1964    D. MAAS    3,118,361
SHUTTER FOR CAMERAS
Filed Oct. 25, 1960    3 Sheets-Sheet 1

INVENTOR.
Dieter Maas
BY Michael S. Striker
his attorney

Jan. 21, 1964  D. MAAS  3,118,361
SHUTTER FOR CAMERAS
Filed Oct. 25, 1960  3 Sheets-Sheet 2

INVENTOR.
Dieter Maas
BY Michael S. Striker
his attorney

Jan. 21, 1964   D. MAAS   3,118,361
SHUTTER FOR CAMERAS

Filed Oct. 25, 1960   3 Sheets-Sheet 3

INVENTOR.
Dieter Maas
BY Michael S. Striker
his attorney

United States Patent Office 3,118,361
Patented Jan. 21, 1964

3,118,361
SHUTTER FOR CAMERAS
Dieter Maas, Munich, Germany, assignor to Agfa Aktiengesellschaft, Leverkusen-Bayerwerk, Germany
Filed Oct. 25, 1960, Ser. No. 64,778
Claims priority, application Germany Oct. 28, 1959
13 Claims. (Cl. 95—59)

The present invention relates to cameras.

One of the objects of the present invention is to provide a camera with a special shutter construction which can operate quite rapidly and repeatedly without any changes in the operation resulting from the repeated operation of the shutter.

Another object of the present invention is to provide for a camera a shutter arrangement where the tensioning of the shutter can be derived from a rotary member which rotates at all times in the same direction so that, for example, a motor may be used for tensioning or cocking the shutter.

It is also an object of the present invention to provide a camera with a reciprocatory shutter means capable of swinging back and forth first in one direction and then in the opposite direction in order to close and open the shutter, the shutter being closed at the ends of the stroke of the shutter.

Still another object of the present invention is to provide a camera with a shutter capable of accomplishing the above objects and at the same time capable of being maintained open for the purposes of setting the camera, for example.

An additional object of the present invention is to provide a camera with a shutter arrangement capable of providing extremely short exposure times while at the same time requiring only a relatively small force for cocking the shutter.

The objects of the present invention also include a provision of a shutter arrangement which will enable the shutter to slow down gradually as it reaches a closed position so that there is a minimum of shock which might undesirably influence the operation of the shutter after repeated use thereof.

It is also an object of the present invention to provide a shutter driving spring with a supporting structure which will prevent undesirable vibration of the spring so that the shutter operation cannot be undesirably influenced by the spring vibrations.

The objects of the present invention also include the provision of an arrangement which will make the most efficient use of the energy of a driving spring.

It is still another object of the present invention to provide a shutter assembly which is capable of having the exposure time thereof adjusted while at the same time providing the above rapid operation and swinging oscillation of the shutter.

With the above objects in view the present invention includes in a camera a support means and a shutter means supported by the support means for movement in one direction from a first closed position to a second closed position and then in an opposite direction back from the second closed position to the first closed position. The camera shutter is open when the shutter means is between these closed positions thereof. A spring means cooperates with the shutter means to move the same between these positions, and this spring means has a minimum tension when the shutter means is between its closed positions. The shutter means as it continues to move beyond the point where the spring means has its minimum tension serving by its own momentum to be moved all the way up to the next position at the same time tensioning the spring means beyond the minimum tension which the spring means has when the shutter means is between its positions, this spring means of course being further tensioned after the shutter reaches one of its closed positions so that when the shutter is released the shutter means will again have a momentum sufficient to carry it through to the next position while tensioning the spring means beyond its minimum tension. A pawl means is carred by the support means and cooperates with the shutter means for releasably maintaining the shutter means in the above positions so that the spring means maintains the tension which it derives from the momentum of the shutter means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
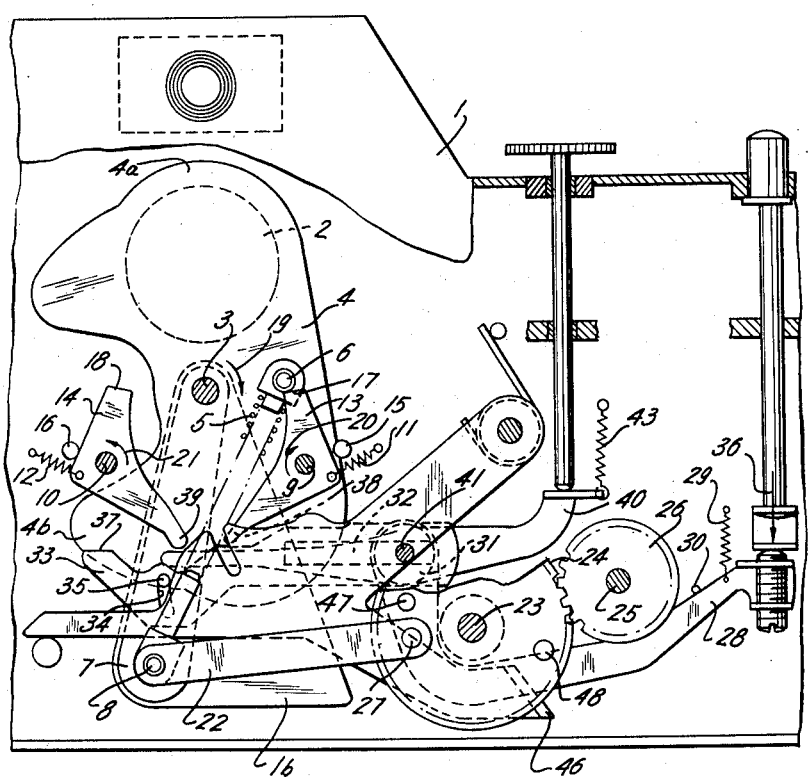
FIG. 1 shows one embodiment of a shutter arrangement according to the present invention, the shutter being shown in its closed and cocked position in FIG. 1.
Figure 2:
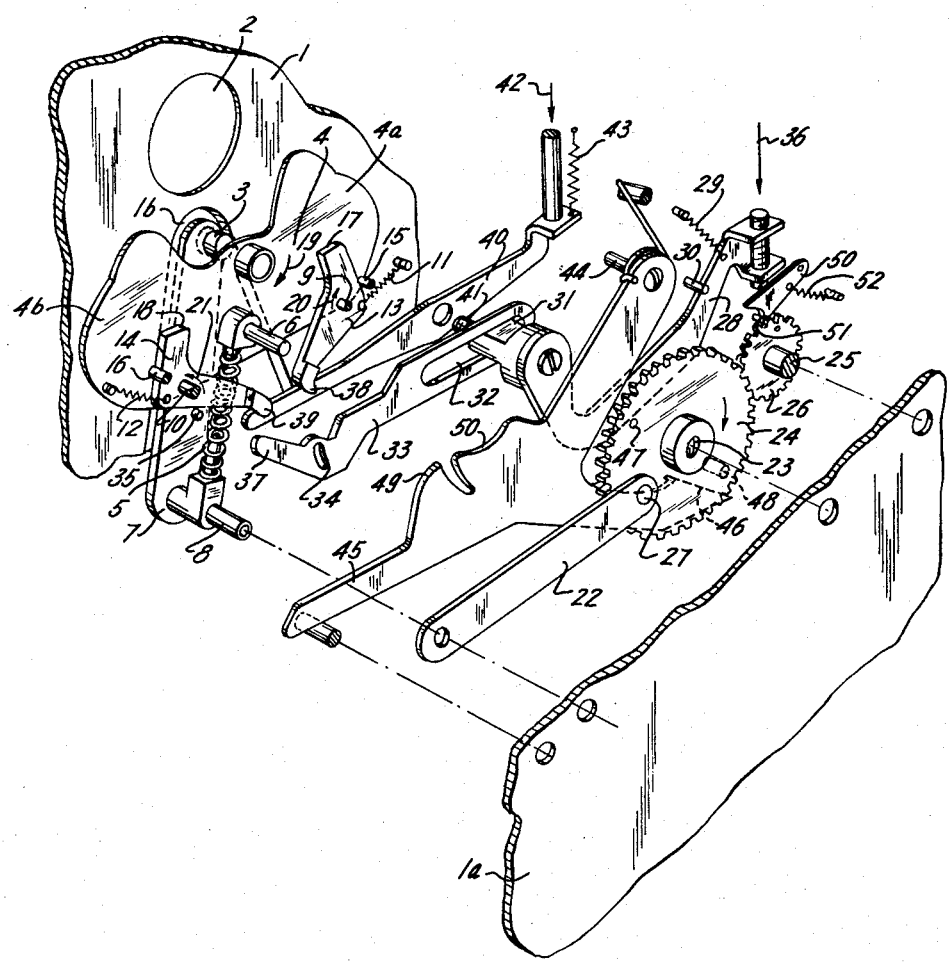
FIG. 2 is a perspective exploded illustration of the structure of FIG. 1, FIG. 2, however, showing the shutter in an open position.

Referring now to FIGS. 1 and 2, there is shown therein a wall 1 located in a plane normal to the optical axis of the camera and forming part of a support means for supporting the structure of the invention. The wall 1 is formed with an opening 2 whose center is located in the optical axis, and when this opening 2 is uncovered an exposure may be made or the camera may be adjusted preparatory to making an exposure. The wall 1 carries a pivot pin 3, and the shutter 4 of FIGS. 1 and 2 is supported for turning movement by the pin 3, so that the wall 1 and the pin 3 form a support means supporting the shutter means of FIGS. 1 and 2 for rotary movement. The shutter 4 is in the form of a single unitary shutter blade which has substantially a butterfly configuration. Thus, the blade 4 has one wing 4a which closes the opening 2 in the position of the parts shown in FIG. 1, so that the shutter is closed in the position of FIG. 1, and the blade 4 is turned in the direction of the arrow 19 of FIG. 1 from the closed position of FIG. 1 to a second closed position where the other wing 4b of the shutter blade closes the opening 2, so that the shutter is again closed. Thus, the shutter means moves from a closed position such as that shown in FIG. 1 first in one direction to a second closed position displaced in a clockwise direction, as viewed in FIG. 1, through 180° from the position shown in FIG. 1, and then during the next exposure the blade 4 turns in a direction opposite to the arrow 19 back to the position shown in FIG. 1. Thus the shutter 4 moves from one closed position to a second closed position and then in an opposite direction back to the first closed position, and the shutter is open when the shutter 4 is located between its closed positions. The wing 4a closes the opening 2 in one of the closed positions of the shutter and the wing 4b closes the opening 2 in the other of the closed positions of the shutter.

A spring means 5 is provided for turning the blade 4 between its closed positions, and this spring means is in the form of an elongated coil spring. One end of the elongated coil spring 5 is fixed to a block formed with an opening through which a pin 8 freely passes so that this block is freely turnable on the pin 8 and so that the spring means is in this way connected to the pin 8, while the opposite or upper end of the spring 5, as viewed in FIG. 1, is fixed to a second block which is formed with a bore through which a pin 6 passes, this pin 6 being fixed to the blade 4, so that in this way the spring means is also connected to the pin 6 and through the latter to the shutter. The pin 8 is fixed to a lever 7 adjacent the lower end thereof, as viewed in FIG. 1, and the opposite, upper end of the lever 7 is pivotally supported by the pin 3 which supports the blade 4 for swinging movement.

A pawl means is provided for releasably holding the shutter means in its closed positions as well as for maintaining the spring 5 tensioned in a manner described below, and this pawl means includes a pair of pawls 13 and 14 pivotally supported by a pair of pins 9 and 10 which are fixedly carried by a wall 1a parallel to the wall 1 and located in front thereof, this wall not being shown in FIG. 1. Thus, it will be seen that the pins 9 and 10 are shown in section since in the plane of FIG. 1 the wall which carries the pins 9 and 10 is not shown. The free ends of the pins 9 and 10 are spaced sufficiently from the wall 1 to provide free turning movement of the blade 4 without any hindrance. The pawls 13 and 14 are respectively acted upon by a pair of coil springs 11 and 12 which respectively urge these pawls into engagement with the stationary stop pins 15 and 16 which are also carried by the same wall which carries the pins 9 and 10, and it will be noted that the pins 15 and 16 are also shown in section for this reason in FIGS. 1 and 2. Thus, the stop pins 15 and 16 also terminate short of the wall 1 by a distance sufficient to provide free unobstructed turning movement of the blade 4. In the closed position of the shutter shown in FIG. 1, the pin 6 is in engagement with the upper edge 17 of the pawl 13, so that this pawl 13 prevents the shutter 4 from being turned in the direction of the arrow 19 and also the pawl 13 cooperates with the pin 6 to maintain the spring 5 under tension. If the pawl 13 is now turned in a clockwise direction, as indicated by the arrow 20 in FIG. 1, then the end surface 17 of the pawl 13 will move away from the pin 6 so as to release the shutter to the force of the spring 5 which then acts on the shutter to turn the latter about the axis of the pivot 3 so that the tension in the spring 5 diminishes while the blade 4 swings in a clockwise direction, as viewed in FIG. 1, and of course during this swinging of the blade 4 the wing 4a will move away from the opening 2 to uncover the latter so that an exposure will be made. When the blade 4 and the pin 6 therewith have turned through approximately 90° in a clockwise direction from the position shown in FIG. 1, the spring 5 will have its minimum tension and in fact will have no tension at all in this position. However, due to the momentum imparted to the blade 4 by the tensioned spring 5 in the position of the parts shown in FIG. 1 when the pawl 13 has turned away from the pin 6, the shutter blade 4 continues to turn beyond 90° from the position shown in FIG. 1, and in fact the momentum of the blade 4 is sufficient to carry it through the next 90° and to move the pin 6 along the right edge of the pawl 14 turning the latter in opposition to the spring 12 until the pin 6 engages the end face 18 of the pawl 14. Thus, the tension of the spring 5 when the shutter is cocked, and the shutter is shown in one such cocked position in FIG. 1, is sufficient to provide the swinging shutter blade 4 with a momentum sufficient to cause this blade to turn beyond the point where the spring 5 has no tension all the way up to the position where the shutter is again closed and the pin 6 is engaged by the other pawl to prevent the shutter from again opening. Of course, during this movement of the shutter under its own momentum to the next closed position the spring 5 is tensioned beyond its point of minimum tension, and in this way part of the energy of the fully tensioned spring 5 is recovered. Thus, when the shutter is closed but not cocked the spring 5 is partly tensioned, and in order to cock the shutter it is only necessary to complete the tensioning of the spring 5 to provide the latter with a force sufficient to impart to the shutter blade a momentum sufficient to carry it over to the next closed position. Thus, after the spring 5 is again fully tensioned the pawl 14 may be turned in opposition to the spring 12 in the direction of the arrow 21, which is to say in a counterclockwise direction, as viewed in FIG. 1, and thus the end 18 of the pawl 14 will move away from the pin 6 to release the latter for turning movement in a direction opposite to that indicated by the arrow 19 back to the position shown in FIG. 1, and the above operations are repeated but in the reverse direction, and the pin 6 will again be engaged by the surface 17 of the pawl 13. In this way during the successive exposures the shutter 4 is swung first in one direction and then in the other direction between its pair of closed positions, and when the shutter is between these closed positions, as indicated in FIG. 2, the shutter is open and an exposure may be made.

In order to tension the spring 5 beyond the tension derived from the momentum of the swinging shutter, a crank means is provided, and this crank means includes the link 22 pivotally connected at one end to the pin 8 and at its opposite end to a pin 27 which is carried by a rotary crank disc 24 which has a toothed periphery so as to take the form of a gear, this gear 24 being supported for rotary movement by the stationary shaft 23. The hub of the gear 24 is apparent in FIG. 2, and the pin 27 extends beyond the face of the gear 24 visible in FIG. 2 by a distance sufficient to locate the link 22 forwardly of the hub of the gear as well as the end of the shaft 23 so that the link 22 can extend across the shaft 23 and the hub of the gear 24. The gear 24 meshes with a gear 26 which is fixedly carried by the rotary tensioning shaft 25, and the transmission ratio provided by the gears 24 and 26 is 2:1, so that for each complete rotation of the shaft 25 and gear 26 the crank means 22, 24 turns through one half rotation. Due to this 180° turning of the gear 24 at each tensioning derived from a single revolution of the shaft 25, the lever 7 will be angularly positioned first in the position shown in FIG. 1 and then in an oppositely inclined position, and since in this latter position the pin 6 will be engaged by the pawl 14, it is apparent that at this time the spring 5 will also be fully tensioned. Of course, when the pin 6 engages the surface 18 of the pawl 14 and the spring 5 is fully tensioned the pin 27 is displaced through 180° about the shaft 23 from the position shown in FIG. 1 and of course the link 22 extends across the shaft 23 and the gear 24 up to the pin 27, so that the lever 7 is inclined in the opposite direction from that shown in FIG. 1. The tensioning or cocking of the shutter with each revolution of the gear 26 and the shaft 25 is of particular advantage for a camera where the cocking of the shutter is derived from a motor. Furthermore, the transmission ratio provided by the gears 24 and 26 is of particular advantage since the force required to be exerted by the elements 25 and 26 on the gear 24 for tensioning the spring 25 is quite small while at the same time the spring 5 is tensioned to the desired degree, so that this transmission ratio gives a considerable mechanical advantage which is very favorable.

In order to release the shutter the pawls 13 and 14 are alternately actuated in the directions of the arrows 20 and 21, respectively. The release means includes the release lever 28 which, as is shown in FIGS. 1 and 2, is turnably supported by a stationary pivot pin 41 fixed, for example, to the wall 1. As is shown in FIG. 2, the lever 28 is connected with a spring 29 fixed to a stationary pin, and this spring 29 urges the lever 28 against a stationary stop pin 30. The lever 28 is fixed with an axially bored extension 31 forming part of the lever 28 and turnable on the pin 41, and this extension 31 of the lever 28 has a portion of substantially rectangular cross section extending through an elongated slot 32 formed in a release controlling lever 33. Due to the shape of the portion 31 of lever 28 extending through the slot 32, the lever 33 is constrained to tilt with the lever 28 about the pin 41, but at the same time the lever 33 is longitudinally shiftable on the portion 31 of the lever 28. The control lever 33 is formed with a slot 34 which receives a pin 35 fixed to the lever 7, so that when the lever 7 is turned one way or the other by the crank means 22, 24 during tensioning of the spring 5, the pin 35 will act in the slot 34 on the lever 33 to shift the latter in one direction or the other along the portion 31 of the lever 28, and in this way the lever 33 will always be positioned to cause the turning of the lever 28 to actuate that pawl which at the particular moment engages the pin 6. As is apparent from FIG. 1 the upper edge of the lever 33 is formed adjacent its left free end 37 with a substantially W-shaped cutout, and the upper edge of the lever 33 on opposite sides of this W-shaped cutout or notch cooperates with the pawls to actuate the latter. Thus, referring to FIG. 1, it will be seen that when the pin 6 has engaged the surface 17 of the pawl 13, the crank 22, 24 is turned to the position illustrated in FIG. 1 for tensioning the spring 5, and thus the pin 35 has acted on the lever 33 to shift the latter to the left so that the portion 31 of the lever 28 is located adjacent the right end of the slot 32, as viewed in FIG. 1. At this time the upper edge of the lever 33 which is located just to the right of the W-shaped notch will engage the lower end 38 of the pawl 13 when the release lever 28 is acted on in the direction of the arrow 36 shown in FIGS. 1 and 2, while the end 39 will extend into the W-shaped notch so that only the pawl 13 will be turned in opposition to the spring 11 at this time so as to release the shutter. On the other hand, when the pin 6 is in engagement with the surface 18 of the pawl 14, then when the spring 5 is tensioned the pin 35 is located at a substantial distance to the right of the position thereof shown in FIG. 1, and thus the lever 33 is at this time shifted, upon cocking of the shutter, so as to locate the left end of the slot 32 in the region of the portion 31 of the lever 28, and when the control lever 33 is in this position and the lever 28 is turned by a force acting in the direction of the arrow 36, the upper edge of the lever 33 at a portion located just to the left of the W-shaped notch will engage the portion 39 of the lever 14 to turn the latter in opposition to the spring 12, while the pawl 13 will not be actuated at this time, and in this way the structure operates to actuate the pawls 13 and 14 alternately and in the proper sequence for causing the shutter to swing first in one direction and then in the other direction in the manner described above.

For certain special cameras it is desirable to be able to set the camera up by viewing the subject directly through the opening 2, and for this purpose it is necessary to maintain the shutter 4 in an open position. This is achieved with the embodiment of FIGS. 1 and 2 by way of a lever 40 which is pivotally carried by the same pin 41 that turnably supports lever 28, and at its right end, as viewed in FIG. 1, the lever 40 is engaged by a manually depressible pin capable of being moved in the direction of the arrow 42, shown in FIG. 2, in opposition to the spring 43 shown in FIG. 1. When the right end of the lever 40 is depressed, as indicated by the arrow 42, the left end of the lever 40 will be raised, and this left end of the lever 40 is located just beneath the ends 38 and 39 of the pawls 13 and 14, so that by turning the lever 40 in a clockwise direction, as viewed in FIGS. 1 and 2, the elongated left end portion of the lever 40 will engage both of the pawls to turn both of the pawls 13 and 14 simultaneously in opposition to the springs 11 and 12, and thus both pawls will be maintained in a position where they will not cooperate with the pin 6 to maintain the shutter closed, and thus the shutter blade 4 will remain at approximately the position indicated in FIG. 2, enabling the camera to be set up for making an exposure.

After the lever 40 is released so that the pawls 13 and 14 can turn to their rest position engaging the stops 15 and 16, the shutter 4 will of course still be between its closed positions since it has no momentum at this time and is not turning. In order to move the shutter 4 at this tme to the next position, a lever 45 is provided, this lever 45 being turnably supported by a stationary pin 44 carried by the wall 1, for example, and it will be seen from FIGS. 1 and 2 that a spring is coiled about the pin 44, engages with one end a stationary pin, and with its opposite end engages the upper edge of the lever 44 so as to urge the latter to turn in a counterclockwise direction about the pin 44, as viewed in FIGS. 1 and 2. At its left end the lower edge of lever 45 engages a stationary stop pin, as is evident from FIGS. 1 and 2, so that in this way the lever 45 is maintained in its position of rest shown in FIGS. 1 and 2. In this position of rest, it will be seen that lever 45 has a lower right inclined portion 46, and this portion 46 of the lever 45 is located in the path of turning movement of a pair of pins 47 and 48 carried by the gear 24. Thus, during each half revolution of the gear 24 one of the pins 47 or 48 will engage the lever 45 to turn the latter in a clockwise direction until the pin 47 or 48 rides off the portion 46 of the lever 45 which will then be returned by the spring coiled about the pin 44 in a counterclockwise direction back to the rest position shown in FIGS. 1 and 2. As is shown in FIG. 2, the lever 45 has a pair of upper edge portions 49 and 50. Assuming that the lever 40 is actuated when the shutter is in the position shown in FIG. 1, it will be seen that due to the inclination of the lever 7 the pin 6 when the spring 5 is without tension will be located slightly to the left of a vertical plane which includes the optical axis and the axis of the pin 3, so that when the gear 24 turns through the next half revolution the pin 48 will turn the lever 45 to cause the edge portion 49 thereof to engage the pin 6 and move the latter up to the edge 18 of the pawl 14, so that in this way the shutter is set for the next operation. On the other hand, if the pin 6 is in engagement with the pawl 14 when the lever 40 is actuated, then the lever 7 will be tilted in the direction opposite from that shown in FIG. 1 and the pin 6 will be located to the right of the plane which includes the optical axis and the axis of the pin 3, so that during the next turning of the lever 45 the surface 50 thereof will engage the pin 6 and move the latter up to the top surface 17 of the pawl 13, and in this way the shutter will again be ready to make the next exposure.

Figure 3:
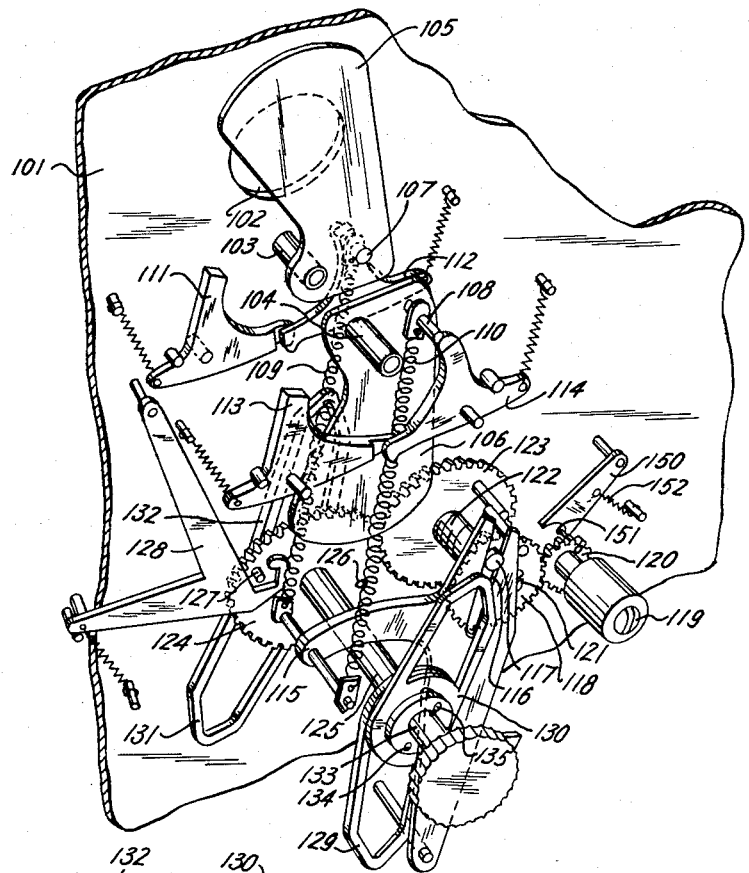
FIG. 3 is a perspective exploded illustration of another embodiment of a shutter according to the present invention.
Figure 5:
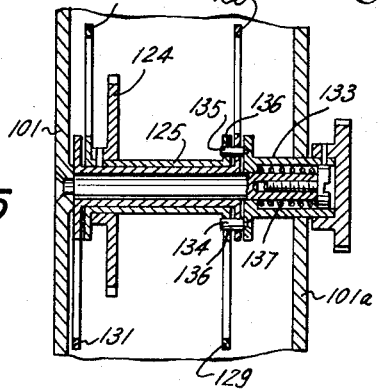
FIG. 5 shows a detail of the structure of FIG. 3, showing details for variation of the shutter times.

In the embodiment of FIGS. 1 and 2 the swinging shutter blade 4 provides a predetermined exposure time as it moves from one closed position to the next closed position, and it may be desirable under some circumstances to change the exposure time, and the embodiment which is shown in FIG. 3 is capable of accomplishing this result.

In the embodiment of FIG. 3, instead of a single unitary shutter blade having a pair of wings, the shutter means is formed by the pair of separable blades 105 and 106 which are respectively supported by the stationary pins 103 and 104 for rotary movement about the common axis of the pins 103 and 104, the pin 103 being fixedly carried by the wall 101, while the pin 104 is fixedly carried by the second wall which is parallel to the wall 101 and located in front of the latter and therefore not shown in the drawings. As is apparent from FIG. 3 both of the blades 105 and 106 together provide the shutter means 105, 106 with a substantially butterfly configuration. Pins 107 and 108 are respectively fixed to the blades 105 and 106, and the spring means of this embodiment takes the form of a pair of coil springs 109 and 110 respectively connected operatively with pins 107 and 108 for acting through the latter on the pair of shutter blades 105 and 106, respectively. A pair of pawls 111 and 112 are pivotally carried by the support means to cooperate with the pin 107 of the blade 105, while a second pair of pawls 113 and 114 are pivotally supported to cooperate with the pin 108 for controlling the blade 106. These pawls 111–114 are similar to the pawls 13 and 14 described above and operate in the same way. Thus, springs similar to the springs 11 and 12 act on the several pawls to urge the latter to the rest positions shown in FIG. 3 where these pawls engage stationary stop pins, and the pin 107 cooperates with the upper ends of the pawls 111 and 112 for operating blade 105, while the pin 108 cooperates with the upper ends of the pawls 113 and 114 for controlling the operation of the blade 106. The pair of pawls 111 and 112 have a pair of overlapping actuating portions, and the pair of pawls 113 and 114 have a pair of overlapping actuating portions, and it will be noted that all of these actuating portions of the pawls 111–114 are axially displaced one with respect to the other in the direction of the common axis of turning of the blades 105 and 106.

The spring means formed by the pair of springs 109 and 110 is tensioned by way of a single crank 115 which is common to both of these springs 109 and 110 for tensioning the latter. Thus, the crank 115 is pivotally supported at its bottom end for turning movement about the axis of a stationary pin, and at its upper left end the crank 115 carries a pin which is fixed to the lower end of the springs 109 and 110, as is apparent from FIG. 3. At its upper right portion, the crank 115 is formed with a slot 116 which receives a pin 117 which is fixed to the gear 118, and it is this gear 118 which turns through 180° during each cocking of the spring means, so that the gear 118 corresponds to the gear 24 described above. This gear 118 meshes with a gear 120 which again provides the above transmission ratio according to which a single revolution of the gear 120 will turn the gear 118 through 180°, and the gear 120 is carried by a rotary tensioning shaft 119 which can be driven by a motor, for example, the shaft 119 and gear 120 being turned through one revolution for each exposure.

The gear 118 is supported for rotary movement by a stationary shaft 121 which also supports for rotary movement a gear 123, and a spring 122 is coiled freely around the shaft 121 and has its opposite ends respectively fixed to the gears 118 and 123, so that when the gear 118 is turned by the gear 120 for cocking the shutter by tensioning the springs 109 and 110, the spring 122 will also be tensioned.

The gear 123 meshes with a gear 124 which carries a pair of pins 126 and 127 angularly displaced by 180° with respect to each other, and these pins 126 and 127 are adapted to become alternately located in a notch formed in the upper right portion of the release lever 128 shown in FIG. 3. This release lever 128 is supported for turning movement adjacent its upper end shown in FIG. 3, and a spring is connected to the lower arm of the lever 128 to urge the latter in a counterclockwise direction to the position illustrated where the left free end of the lower arm of the lever 128 engages a stationary stop, as illustrated in FIG. 3. The gear 124 is fixed to a shaft 125 which is supported for rotary movement by any suitable bearings, and when the lever 128 is turned in a clockwise direction in opposition to the spring which urges this lever to its rest position, one or the other of the pins 126 and 127 will be released from the lever 128 so that the spring 122 will be able to act through the gears 123 and 124 on the shaft 125 to rotate the latter. The lever 128 is of course immediately released and thus the gear 124 together with a shaft 125 will only turn 180° at the end of which turning the other of the pins 126 and 127 will be engaged by lever 128 to stop the rotation of the gear 124 and the shaft 125 after one half a revolution.

The shaft 125 caries a sleeve 133 which can be angularly fixed to the shaft 125 at a predetermined angular position selected by the operator for a purpose described below, and the shaft 125 and the sleeve 133 serve to support the levers 129–132. The levers 129–132 rotate with the shaft 125, and during one complete revolution of the shaft 125 together with the levers 129–132 the lever 129 will engage the pawl 113 to actuate the latter, the lever 130 will engage the pawl 114 to actuate this pawl, the lever 131 will actuate the pawl 111, and the lever 132 will actuate the pawl 112. It will be seen that the levers 129–132 are axially displaced one with respect to the other, and these levers are axially positioned respectively in the same planes in which are located the overlapping axially displaced actuating end portions of the pawls 111–114, so that in this way each of the levers 129–132 is aligned with the particular pawl which it is intended to actuate. Actuation of the several pawls by the levers 129–132 will serve to cause the pawls to release the pins 107 and 108 in the proper sequence for causing the blades 105 and 106 to swing about their common turning axis for operating the shutter in the manner described above in connection with FIGS. 1 and 2. In the position of the parts shown in FIG. 3 the pins 107 and 108 are in engagement with the upper ends of the pawls 112 and 114 and the springs 109 and 110 are fully tensioned so that the shutter is cocked. It should be noted that the opening 102 only appears to be uncovered in FIG. 3 because the parts are illustrated in an exploded view where they are moved apart from each other so as to be more clearly illustrated. Actually in the position of the parts shown in FIG. 3 the opening 102 is covered by and closed by the blade 105. Upon actuation of the lever 128 to release the pin 127, the spring 122 will drive the gears 123 and 124 and the shaft 125 together with the sleeve 133 will turn in a counterclockwise direction, as viewed in FIG. 3, and the levers 132 and 130 will respectively actuate the pawls 112 and 114 turning these pawls in a clockwise direction, as viewed in FIG. 3, so that the pins 107 and 108 will be released and the springs 109 and 110 will cause the blades 105 and 106 to turn in a clockwise direction about the common axis of the pins 103 and 104, and these blades will have sufficient momentum to cause the pins 107 and 108 to ride up the pawls 111 and 113 and to engage the top edges thereof in the manner described above in connection with FIGS. 1 and 2, so that in the next closed position of the shutter the springs 109 and 110 are also partially tensioned while the pawls 111 and 113 maintain the shutter in its closed position. During the next shutter actuation the levers 131 and 129 will respectively actuate the pawls 111 and 113 for releasing the shutter to return to the position shown in FIG. 3, and of course before the next operation the gear 120 has turned through a complete revolution for fully tensioning the springs 109 and 110 as well as the spring 122. If it is assumed that the levers 130 and 132 are exactly aligned with each other and are displaced by exactly 180° with respect to the levers 129 and 131, it is apparent that both of the blades 105 and 106 will be simultaneously released and will turn as a unit between the closed positions of the shutter, so that the operation will be very much like that of FIGS. 1 and 2. In order to vary the exposure time this angular relationship between the levers can be changed. For example, in the position shown in FIG. 3 it is apparent that the blade 105 will uncover the shutter while the blade 106 will cause the shutter to be closed in the next position of the parts, and therefore it is possible to adjust the levers so that instead of simultaneously release of the blades 105 and 106 the blade 106 is released after the blade 105 in order to vary the exposure time. For this purpose the levers 130 and 131 are fixed to the sleeve 133 while the levers 129 and 132 are fixed directly to the shaft 125. The shaft 125 is fixed with a collar or provided with a shoulder which has openings adapted to receive the pins 134 and 135 in a plurality of angular positions of the sleeve 133, and the knob shown in FIG. 3 is provided and is accessible to the operator for turning the sleeve 133 so as to locate the pins 134 and 135 in selected openings of the shaft 125 so that in this way the angular position of the levers 130 and 131 with respect to the levers 129 and 132 can be regulated by the operator. Thus, it is possible to displace the lever 130 angularly with respect to the lever 132 so that when the shutter is released with the parts in the position of FIG. 3, as described above, the lever 132 will actuate the pawl 112 before the lever 130 actuates the pawl 114, and thus the blade 106 will start its swinging movement after the blade 105 has started and in this way the exposure time will be influenced. Of course, since the lever 131 is adjusted with the lever 130 and has with respect to the lever 129 the same angular position that the lever 130 has with respect to the lever 132, during the next operation of the shutter the lever 129 will actuate the pawl 113 in advance of the moment when the lever 131 actuates the pawl 111, so that the blade 106 will in this case turn in advance of the blade 105 and the exposure time will be the same during the subsequent operation of the shutter. The sleeve 133 passes through the levers 129 and 132. The levers 129 and 132 are fixed directly to the shaft 125, and the levers 130 and 131 are fixed by projections directly to the sleeve 133. Sleeve 129 and sleeve 130 may be brought into different relative positions by projections 134, 135 in the sleeve 133 and several bore-holes 136 in the sleeve 129.

The embodiment of FIG. 3 may be provided with a means similar to the lever 40 of FIGS. 1 and 2 enabling the operator to manually maintain the pawls 111–114 in inoperative positions where the shutter will remain open while the operator sets the camera.

Figure 4:
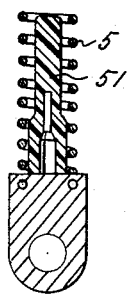
FIG. 4 shows a detail of the structure, the detail of FIG. 4 enabling vibrations of a shutter driving spring to be eliminated.

According to a further feature of the invention, the spring 5, as shown in FIG. 4, as well as the springs 109 and 110 are coiled about elastic members 51 made of soft rubber, for example, and extending between the blocks to which the springs themselves are fixed, so that in this way the elastic cores 51 prevent vibrations of the springs 5 or 109, 110, and in this way such vibrations cannot undesirably influence the swinging movement of the shutter. Thus, the exposure time will be very accurately maintained and the life of the springs 5 and 109, 110 will also be increased since vibrations of these springs will be prevented.

Furthermore, it will be noted that the levers 129–132 are formed with rather large cutouts, as illustrated in FIG. 3, so that they are somewhat springy so as to reduce the shocks which take place during operation of the shutter and also provide a lesser resistance to movement of the parts, and in this way also the life of the shutter is increased.

It will be understood that each of the elements described above, or two or more together, may also find a useful application in other types of cameras differing from the types described above.

While the invention has been illustrated and described as embodied in shutters for cameras, it is not intended to be limited to the details shown, since various modifications and structural changes may be made without departing in any way from the spirit of the present invention.

Without the use of additional analysis, the foregoing will so fully reveal the gist of the present invention that others can by applying current knowledge readily adapt it for various applications without omitting features that, from the standpoint of prior art, fairly constitute essential characterisics of the generic or specific aspects of this invention, and therefore, such adaptations should and are intended to be comprehended within the meaning and range of equivalence of the following claims.

What is claimed as new and desired to be secured by Letters Patent is:

1. In a camera, in combination, support means; shutter means supported by said support means for movement in one direction from a first closed position to a second closed position and then in an opposite direction back from said second closed position to said first closed position, the camera shutter being open when said shutter means is between said positions; spring means cooperating with said shutter means for moving the same between said positions, said spring means having a minimum tension when said shutter means is between said positions and the momentum of said shutter means as it continues to move tensioning said spring means beyond said minimum tension until said shutter means reaches one of said positions; a pair of pawl means carried by said support means and cooperating with said shutter means for releasably maintaining the latter in said positions, respectively, so that said spring means retains the tension derived from the momentum of said shutter means; and manually operable means coacting with said pair of pawl means for actuating whichever one of said pawl means retains said shutter means in one of said positions thereof to release said shutter means while leaving the other pawl means in a position of readiness to retain said shutter means when it reaches the other of said positions thereof, so that irrespective of how the manually operable means is manipulated the shutter means will be retained in said other position.

2. In a camera, in combination, support means; shutter means supported by said support means for movement in one direction from a first closed position to a second closed position and then in an opposite direction back from said second closed position to said first closed position, the camera shutter being open when said shutter means is between said positions; spring means cooperating with said shutter means for moving the same between said positions, said spring means having a minimum tension when said shutter means is between said positions and the momentum of said shutter means as it continues to move tensioning said spring means beyond said minimum tension until said shutter means reaches one of said positions, said spring means including an elongated coil spring and an elongated elastic member about which said coil spring is coiled, so that said elastic member prevents vibrations of said coil spring; and pawl means carried by said support means and cooperating with said shutter means for releasably maintaining the latter in said positions so that said spring means retains the tension derived from the momentum of said shutter means.

3. In a camera, in combination, support means; shutter means supported by said support means for movement in one direction from a first closed position to a second closed position and then in an opposite direction back from said second closed poistion to said first closed position, the camera shutter being open when said shutter means is between said positions; spring means cooperating with said shutter means for moving the same between said positions, said spring means having a minimum tension when said shutter means is between said positions and the momentum of said shutter means as it continues to move tensioning said spring means beyond said minimum tension until said shutter means reaches one of said positions; a pair of pawl means carried by said suport means and cooperating with said shutter means for releasably maintaining the latter in said positions, respectively, so that said spring means retains the tension derived from the momentum of said shutter means manually operable shutter release means coacting with said pair of pawl means for actuating the latter to release said shutter means for movement between said positions thereof, said manually operable shutter release means being adjustable between a first and a second position in one of which it cooperates with only one of said pawl means and in the other of which it cooperates only with the other of said pawl means; and adjusting means for moving said manually operable shutter release means between said first and second positions thereof for respectively cooperating only with said one or only with said other of said pawl means; and tensioning means cooperating with said spring means for tensioning the same beyond the tension derived from the momentum of said shutter means preparatory to the next operation of the shutter means, said tensioning means including a rotary tensioning shaft and crank means operatively connected to said tensioning shaft to be driven thereby first in one direction while said tensioning shaft turns in a predetermined direction after said shutter means has moved from said first to said second closed position and then in an opposite direction while said shaft again turns in said predetermined direction after said shutter means has moved from said second to said first position, said crank means being operatively connected to said spring means for tensioning the latter when said rotary tensioning shaft turns.

4. In a camera, in combination, support means; shutter means supported by said support means for movement in one direction from a first closed position to a second closed position and then in an opposite direction back from said second closed position to said first closed position, the camera shutter being open when said shutter means is between said positions; spring means cooperating with said shutter means for moving the same between said positions, said spring means having a minimum tension when said shutter means is between said positions and the momentum of said shutter means as it continues to move tensioning said spring means beyond said minimum tension until said shutter means reaches one of said positions; a pair of pawl means carried by said support means and cooperating with said shutter means for releasably maintaining the latter in said positions, respectively, so that said spring means retains the tension derived from the momentum of said shutter means manually operable shutter release means coacting with said pair of pawl means for actuating the latter to release said shutter means for movement between said positions thereof, said manually operable shutter release means being adjustable between a first and a second position in one of which it cooperates with only one of said pawl means and in the other of which it cooperates only with the other of said pawl means; and adjusting means for moving said manually operable shutter release means between said first and second positions thereof for respectively cooperating only with said one or only with said other of said pawl means; and tensioning means cooperating with said spring means for tensioning the same beyond the tension derived from the momentum of said shutter means preparatory to the next operation of the shutter means, said tensioning means including a rotary tensioning shaft and crank means operatively connected to said tensioning shaft to be driven thereby first in one direction while said tensioning shaft turns in a predetermined direction after said shutter means has moved from said first to said second closed position and then in an opposite direction while said shaft again turns in said predetermined direction after said shutter means has moved from said second to said first position, said crank means being operatively connected to said spring means for tensioning the latter when said rotary tensioning shaft turns, said rotary tensioning shaft cooperating with said crank means for moving the latter through a tensioning cycle and said crank means including a rotary crank member which turns through 180° during each of said cycles.

5. In a camera, in combination, support means; shutter means supported by said support means for movement in one direction from a first closed position to a second closed position and then in an opposite direction back from said second closed position to said first closed position, the camera shutter being open when said shutter means is between said positions; spring means cooperating with said shutter means for moving the same between said positions, said spring means having a minimum tension when said shutter means is between said positions and the momentum of said shutter means as it continues to move tensioning said spring means beyond said minimum tension until said shutter means reaches one of said positions; a pair of pawl means carried by said support means and cooperating with said shutter means for releasably maintaining the latter in said positions, respectively, so that said spring means retains the tension derived from the momentum of said shutter means manually operable shutter release means coacting with said pair of pawl means for actuating the latter to release said shutter means for movement between said positions thereof, said manually operable shutter release means being adjustable between a first and a second position in one of which it cooperates with only one of said pawl means and in the other of which it cooperates only with the other of said pawl means; and adjusting means for moving said manually operable shutter release means between said first and second positions thereof for respectively cooperating only with said one or only with said other of said pawl means; and tensioning means cooperating with said spring means for tensioning the same beyond the tension derived from the momentum of said shutter means preparatory to the next operation of the shutter means, said tensioning means including a rotary tensioning shaft and crank means operatively connected to said tensioning shaft to be driven thereby in opposite directions during unidirectional rotation of said shaft, said crank means being operatively connected to said spring means for tensioning the latter when said rotary tensioning shaft turns, said rotary tensioning shaft cooperating with said crank means for moving the latter through a tensioning cycle and said crank means including a rotary crank member which turns through 180° during each of said cycles, and transmission means located between and cooperating with said crank means and rotary tensioning shaft and providing a predetermined transmission ratio between said rotary tensioning shaft and crank means.

6. In a camera as recited in claim 1, said shutter means including a pair of separate shutter members supported by said support means for rotary movement about a common axis, one of said members closing the camera shutter in one of said closed positions of said shutter means and the other of said members closing the camera shutter in the other of said closed positions of said shutter means, said pawl means including a pair of pawl members for each of said shutter members.

7. In a camera as recited in claim 1, said shutter means including a pair of separate shutter members supported by said support means for rotary movement about a common axis, one of said members closing the camera shutter in one of said closed positions of said shutter means and the other of said members closing the camera shutter in the other of said closed positions of said shutter means, said pawl means including a pair of pawl members for each of said shutter members so that four pawl members are provided for said pair of shutter members, said four pawl members respectively having four actuating portions axially displaced with respect to each other in a direction parallel to the common turning axis of said shutter members; and lever means cooperating with said actuating portions of said pawls for actuating the latter in a predetermined sequence, said lever means including four levers which are also axially displaced one with respect to the other so as to be respectively aligned with said actuating portions of said pawls.

8. In a camera, in combination, support means; shutter means supported by said support means for movement in one direction from a first closed position to a second closed position and then in an opposite direction back from said second closed position to said first closed position, the camera shutter being open when said shutter means is between said positions; spring means cooperating with said shutter means for moving the same between said positions, said spring means having a minimum tension when said shutter means is between said positions and the momentum of said shutter means as it continues to move tensioning said spring means beyond said minimum tension until said shutter means reaches one of said positions; pawl means carried by said support means and cooperating with said shutter means for releasably maintaining the latter in said positions so that said spring means retains the tension derived from the momentum of said shutter means; and tensioning means operatively connected to said spring means for tensioning the latter in both of said closed positions of said shutter means, said tensioning means including a unidirectional drive member which rotates at all times in the same direction during actuation of said tensioning means, said shutter means including a pair of separate shutter members supported by said support means for rotary movement about a common axis, one of said members closing the camera shutter in one of said closed positions of said shutter means and the other of said members closing the camera shutter in the other of said closed positions of said shutter means, said pawl means including a pair of pawl members for each of said shutter members so that four pawl members are provided for said pair of shutter members, said four pawl members respectively having four actuating portions axially displaced with respect to each other in a direction parallel to the common turning axis of said shutter members; and lever means cooperating with said actuating portions of said pawls for actuating the latter in a predetermined sequence, said lever means including four levers which are also axially displaced one with respect to the other so as to be respectively aligned with said actuating portions of said pawls, a pair of said levers respectively actuating one of each of said pairs of pawls for moving said shutter means in said one direction and the remaining pair of levers cooperating with the others of said pairs of pawls for releasing said shutter means for movement in said opposite direction.

9. In a camera, in combination, support means; shutter means supported by said support means for movement in one direction from a first closed position to a second closed position and then in an opposite direction back from said second closed position to said first closed position, the camera shutter being open when said shutter means is between said positions; spring means cooperating with said shutter means for moving the same between said positions, said spring means having a minimum tension when said shutter means is between said positions and the momentum of said shutter means as it continues to move tensioning said spring means beyond said minimum tension until said shutter means reaches one of said posiitons; pawl means carried by said support means and cooperating with said shutter means for releasably maintaining the latter in said positions so that said spring means retains the tension derived from the momentum of said shutter means; and tensioning means operatively connected to said spring means for tensioning the latter in both of said closed positions of said shutter means, said tensioning means including a unidirectional drive member which rotates at all times in the same direction during actuation of said tensioning means, said shutter means including a pair of separate shutter members supported by said support means for rotary movement about a common axis, one of said members closing the camera shutter in one of said closed positions of said shutter means and the other of said members closing the camera shutter in the other of said closed positions of said shutter means, said pawl means including a pair of pawl members for each of said shutter members so that four pawl members are provided for said pair of shutter members, said four pawl members respectively having four actuating portions axially displaced with respect to each other in a direction parallel to the common turning axis of said shutter members; and lever means cooperating with said actuating portions of said pawls for actuating the latter in a predetermined sequence, said lever means including four levers which are also axially displaced one with respect to the other so as to be respectively aligned with said actuating portions of said pawls, a pair of said levers respectively actuating one of each of said pairs of pawls for moving said shutter means in said one direction and the remaining pair of levers cooperating with the others of said pairs of pawls for releasing said shutter means for movement in said opposite direction, said lever means including a shaft fixedly carrying two of said levers and a sleeve on said shaft, said sleeve fixedly carrying the other two of said levers.

10. In a camera, in combination, support means; shutter means supported by said support means for movement in one direction from a first closed position to a second closed position and then in an opposite direction back from said second closed position to said first closed position, the camera shutter being open when said shutter means is between said positions; spring means cooperating with said shutter means for moving the same between said positions, said spring means having a minimum tension when said shutter means is between said positions and the momentum of said shutter means as it continues to move tensioning said spring means beyond said minimum tension until said shutter means reaches one of said positions; pawl means carried by said support means and cooperating with said shutter means for releasably maintaining the latter in said positions so that said spring means retains the tension derived from the momentum of said shutter means; and tensioning means operatively connected to said spring means for tensioning the latter in both of said closed posiitons of said shutter means, said tensioning means including a unidirectional drive member which rotates at all times in the same direction during actuation of said tensioning means, said shutter means including a pair of separate shutter members supported by said support means for rotary movement about a common axis, one of said members closing the camera shutter in one of said closed positions of said shutter means and the other of said members closing the camera shutter in the other of said closed positions of said shutter means, said pawl means including a pair of pawl members for each of said shutter members so that four pawl members are provided for said pair of shutter members, said four pawl members respectively having four actuating portions axially displaced with respect to each other in a direction parallel to the common turning axis of said shutter members; lever means cooperating with said actuating portions of said pawls for actuating the latter in a predetermined sequence, said lever means including four levers which are also axially displaced one with respect to the other so as to be respectively aligned with said actuating portions of said pawls, a pair of said levers respectively actuating one of each of said pairs of pawls for moving said shutter means in said one direction and the remaining pair of levers cooperating with the others of said pairs of pawls for releasing said shutter means for movement in said opposite direction, said lever means including a shaft fixedly carrying two of said levers and a sleeve on said shaft, said sleeve fixedly carrying the other two of said levers; and means for adjustably connecting said sleeve to said shaft in a selected angular position relative thereto so that said levers may be adjusted to influence the exposure time.

11. In a camera, in combination, support means; shutter means supported by said support means for movement in one direction from a first closed position to a second closed position and then in an opposite direction back from said second closed position to said first closed position, the camera shutter being open when said shutter means is between said positions, said shutter means including a pair of shutter blades which together provide said shutter means with a substantially butterfly configuration; spring means cooperating with said shutter means for moving the same between said positions, said spring means having a minimum tension when said shutter means is between said positions and the momentum of said shutter means as it continues to move tensioning said spring means beyond said minimum tension until said shutter means reaches one of said positions; a pair of pawl means carried by said support means and cooperating with said shutter means for releasably maintaining the latter in said positions so that said spring means retains the tension derived from the momentum of said shutter means; and manually operable means coacting with said pair of pawl means for actuating whichever one of said pawl means retains said shutter means in one of said positions thereof to release said shutter means while leaving the other pawl means in a position of readiness to retain said shutter means when it reaches the other of said positions thereof, so that irrespective of how the manually operable means is manipulated the shutter means will be retained in said other position.

12. In a camera, in combination, support means; shutter means supported by said support means for rotary movement about a predetermined axis which is parallel to the optical axis through approximately 180° in one direction from a first closed position to a second closed position and then in an opposite direction through approximately 180° from said second closed position back to said first closed position, the camera shutter being open when said shutter means is between said positions and said shutter means having a configuration which is symmetrical with respect to its turning axis so that said shutter means remains balanced while turning between said positions; elongated coil spring means having at one end a connection to said shutter means at a location spaced from the turning axis thereof, and said connection turning with said shutter means through approximately 180° between said positions thereof, said elongated coil spring means having distant from said connection a free end portion located at a substantial distance beyond said shutter means; lever means carried by said support means for turning movement about an axis parallel to the optical axis and operatively connected to said free end portion of said spring means for moving said free end portion of said spring means first in one direction when said shutter means is in one of said positions thereof and then in an opposite direction when said shutter means is in the other position thereof for tensioning said spring means preparatory to making the next exposure, said spring means having on one side of a plane which includes the turning axis of said shutter means and the optical axis a position when said shutter means is in said first closed position thereof which exactly corresponds to the position of said spring means with respect to said plane on the other side thereof when said shutter is in said second closed position, whereby identical forces act on said shutter means during movement thereof in said directions between said closed positions thereof, and said connection of said spring means to said shutter means being located at approximately the same elevation with respect to the turning axis of said shutter means in both of said closed positions thereof, said turning axis of said lever means coinciding with the turning axis of said shutter means.

13. In a camera, in combination, support means; shutter means supported by said support means for movement in one direction from a first closed position to a second closed position and then in an opposite direction back from said second closed position to said first closed position, the camera shutter being open when said shutter means is between said positions; energy-storing means cooperating with said shutter means for moving the same between said positions, said energy-storing means exerting a minimum force when said shutter means is between said positions; the momentum of said shutter means as it continues to move storing energy in said energy-storing means beyond the minimum energy stored thereby until said shutter means reaches one of said positions; a pair of retaining means carried by said support means and cooperating with said shutter means for releasably retaining the latter in said positions, respectively, so that said energy-storing means retains the energy derived from the momentum of said shutter means; manually operable shutter release means coacting with said pair of retaining means for actuating the latter to release such shutter means for movement between said positions thereof, said manually operable shutter release means being adjustable between a first and a second position in one of which it cooperates wtih one of said retaining means and in the other of which it cooperates only with the other of said retaining means; and adjusting means for moving said manually operable shutter release means between said first and second positions thereof for respectively cooperating only with said one or only with said other of said retaining means.

References Cited in the file of this patent
UNITED STATES PATENTS

| | | |
|---|---|---|
| 429,929 | Luce | June 10, 1890 |
| 512,655 | Lewis | Jan. 9, 1894 |
| 512,671 | Eddy | Jan. 9, 1894 |
| 517,164 | Lightford | Mar. 27, 1894 |
| 581,984 | Esmond | May 4, 1897 |
| 745,272 | Bornmann | Nov. 24, 1903 |
| 1,676,529 | Cuendet | July 10, 1928 |
| 2,076,191 | Adams | Apr. 6, 1937 |
| 2,153,153 | Nelson | Apr. 4, 1939 |
| 2,728,282 | Weiss | Dec. 27, 1955 |
| 2,800,844 | Durst | July 30, 1957 |
| 2,857,829 | Rentschler | Oct. 28, 1958 |